United States Patent [19]

Krauss

[11] Patent Number: 4,646,394
[45] Date of Patent: Mar. 3, 1987

[54] CORD LOCK

[75] Inventor: Mark J. Krauss, New York, N.Y.

[73] Assignee: American Cord & Webbing Co., Inc., N.Y.

[21] Appl. No.: 817,075

[22] Filed: Jan. 8, 1986

[51] Int. Cl.[4] ...................... B65D 77/10; F16G 11/00
[52] U.S. Cl. .............................. 24/129 R; 24/30.5 S; 24/563; 24/339
[58] Field of Search ......... 24/30.5 S, 30.5 R, 30.5 W, 24/129 R, 129 A, 129 B, 129 C, 129 D, 129 W, 563, DIG. 28, 329, 339, 521, 544, 489, 490, 498, 499

[56] References Cited

U.S. PATENT DOCUMENTS

| | | | |
|---|---|---|---|
| 1,146,934 | 7/1915 | Gleeson | 24/129 R |
| 2,519,987 | 8/1950 | Wernette | 24/563 |
| 3,043,902 | 7/1962 | Klein | 24/129 R |
| 3,257,695 | 6/1966 | Frame | 24/30.5 S |
| 3,772,734 | 11/1973 | Kimel | 24/129 R |
| 3,852,702 | 12/1974 | Dowling | 24/30.5 R |
| 3,983,602 | 10/1976 | Barry | 24/339 |
| 4,357,740 | 11/1982 | Brown | 24/30.5 S |

FOREIGN PATENT DOCUMENTS 688260 3/1953 United Kingdom ............. 24/129 A Primary Examiner—Victor N. Sakran
Attorney, Agent, or Firm—Kane, Dalsimer, Kane, Sullivan and Kurucz

[57] ABSTRACT

A cord lock includes a base and a pair of resilient jaws arranged to engage and lock into one or more cords. One of the jaws includes a handle arm for separating the jaws.

6 Claims, 8 Drawing Figures

CORD LOCK

BACKGROUND OF THE INVENTION

1. Field of Invention

This Invention pertains to a device for interlocking two or more filaments such as string, cords, and so forth, and more particularly to a device for interlocking such filaments without tying. The device may also be used to interengage one or more filaments and a web fabric.

2. Description of the Prior Art

Cords, strings or other filaments are used to tighten or secure the open portions of various articles. For example sacks are frequently provided with a circumferential sleeve for housing a cord. The two ends of the cord are drawn to close the neck. Hoods for various clothing articles such as rain/snow jackets are often provided with draw strings which are tightened to close the hood around the face of the wearer for protection against the elements. Knapsacks are frequently provided with a first cord attached to the body and a second cord attached to a closing flap. In all these applications two filaments must be interlocked in a secure manner but must be disengagable with relative ease and discomfort. Frequently, the two filament ends are interlocked by use of knots. However, knots require a fair amount of dexterity. Furthermore, knots may not be suitable for tying filaments with very large or very small diameters.

Various other devices have been proposed for securing ends of filaments but all of these have been found unsatisfactory because of cost, convenience, and/or appearance.

OBJECTIVES AND SUMMARY OF THE INVENTION

In view of the above, it is a principle objective of the present invention to provide a device which may be used to interlock two or more filaments securely.

A further objective is to provide a device which is easily made by standard manufacturing methods.

Other objectives and advantages shall become apparent from the following description of the invention.

A device for interlocking cords comprises two jaws secured to a common base, at least one of the jaws being resiliently urged against the other so that a cord passing through the jaws is gripped securely. Means are provided for separating the jaws thereby allowing the cords to be removed.

DETAILED DESCRIPTION OF THE INVENTION

In the following description the subject device is identified as a cord lock for the sake of simplicity and shall be described as being used for engaging one or more cords. It should be understood, however, that it could be used to engage or interlock other types of filaments.

Referring now to the Figures, the subject devices may be used for example to close a bag with a cord 12 having two cord ends 14, 16 which are engaged or secured by a cord lock 18.

Figure 2:
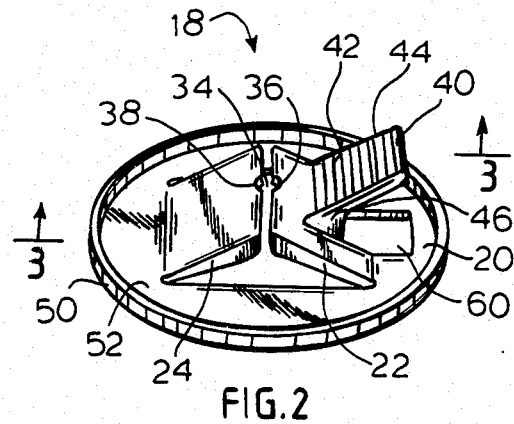
FIG. 2 shows an isometric view of a preferred embodiment of the invention.
Figure 3:
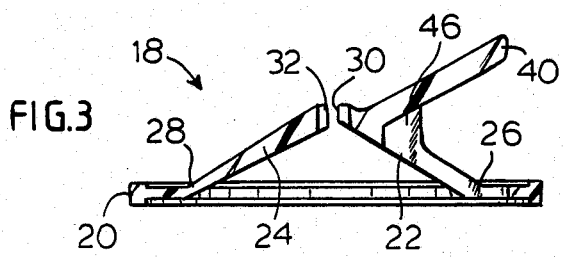
FIG. 3 shows a cross-sectional view of the cord lock of FIG. 2.

As shown in more details in FIGS. 2 and 3, cord lock 18 comprises a base 20, a first jaw 22, and a second jaw 24. The two jaws rise at approximately equal angles from the base to face each other. Preferably, each jaw has a lower portion 26, 28 respectively which is thinner which permits the jaws to flex or pivot with respect to the base. The jaws are shaped in the form of plates which thicken gradually from the lower portions to end faces 30, 3 respectively which are substantially parallel. A circular cord-engaging surface 34 is formed by two notches 36, 38 formed in the end faces. At least one of the jaws, such as jaw 22 is provided with an arm 40 preferably adjoined to a top surface of the jaw at a point nearer to the end face 30 then to the base 20 for an extended leverage. The arm 40 has a top surface 42 which may be grooved as at 44 to provide a non-slip surface. The arm is provided with two lateral stiffening members 46, 48 which extend downward and are connected to jaw 22. The stiffening members are provided to insure that arm 40 does not pivot or flex with respect to jaw 22.

Figure 1:
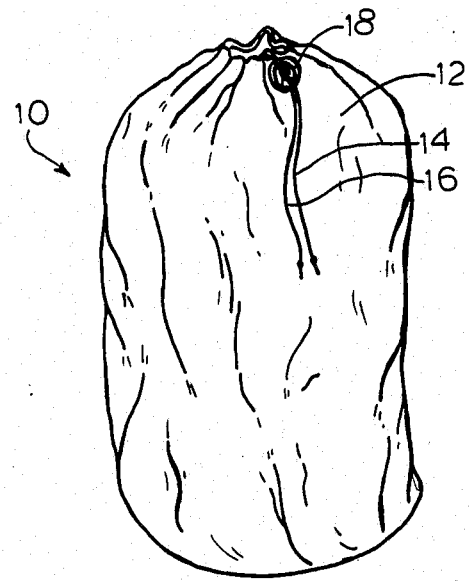
FIG. 1 shows a duffle bag with neck closed by a string, the ends of the string being secured by a cord lock in accordance with the invention.

The base may be made in any desired shape depending on the contemplated usage. For example, in the Figures, the base 20 is circular and it comprises a torroid ring 50 and a relatively thinner central flat membrane 52. The whole cord lock is made from a plastic material with membrane 52 being thin enough so that a sewing machine needle can penetrate it with relative ease. Thus, the lock could be used without attaching it in anyway, as in FIG. 1, or it may be secured to a bag or garment by sewing.

Figure 4:
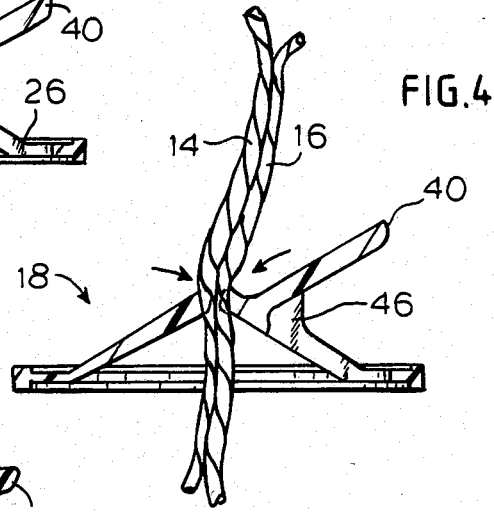
FIG. 4 shows two cords being introduced between the jaws of the cord lock of FIG. 2.
Figure 5:
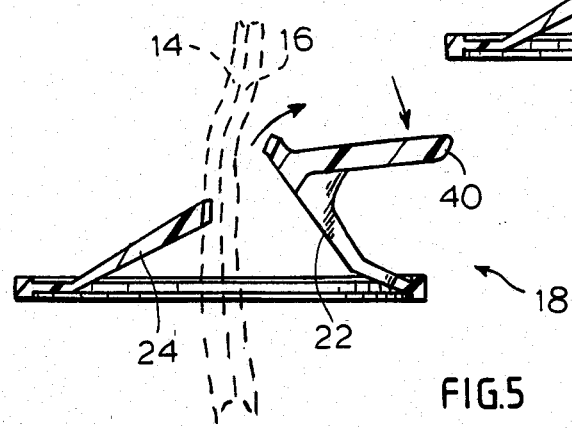
FIG. 5 shows a section view of the jaws of the cord lock cooperating to secure the two cords.
Figure 6:
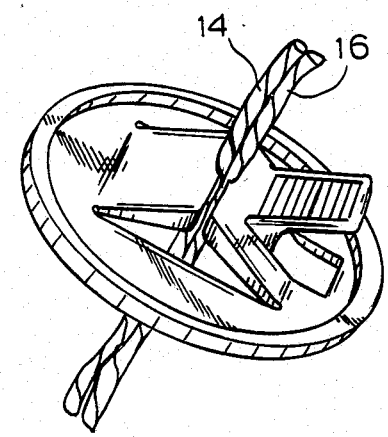
FIG. 6 shows an isometric view of the cord lock of FIG. 5.

The cord lock is operated as follows. The two jaws 22, 24 are separated by pivoting jaw 22 away from jaw 24 through arm 40 until a sufficient space opens between end faces 30, 32 for one or more cords 14, 16 (FIG. 4). Jaw 22 is then allowed to spring back toward its output position thus cooperating with jaw 24 to engage the cords between the faces, and preferably between notches 36, 38 (FIG. 5 and 6). Because of the flexibility of the jaws, the device is able to lock into a number such cords, independently of their diameter or surface structure. The cords are released by again pivoting jaw 22.

Preferably, the device of FIG. 2 is molded from a single flat material. Arm 40 may then be formed by leaving a hole 60 (FIG. 2) in the base. The hole 60 makes the jaw 22 more flexible and permits the arm 40 to be manipulated from either side of the base 20.

Figure 8:
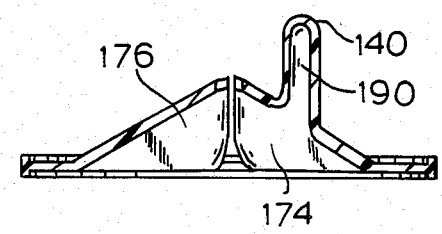
FIG. 8 shows a cross-sectional view of the cord lock of FIG. 7.
Figure 7:
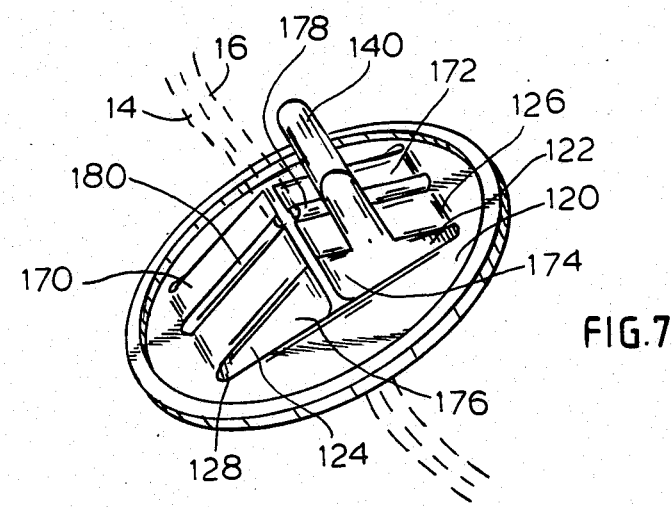
FIG. 7 is an isometric view of an alternate embodiment of the invention.

An alternate embodiment of the invention is shown in FIGS. 7 and 8. This embodiment also comprises a base 120 and two jaws 122 and 124 which may pivot with respect to the base at 126 and 128 respectively. However, in this embodiment, the jaws in addition to the relatively flat members 170, 172 also comprise side skirts 174, 176 respectively provided as stiffening means. The skirt extends toward, but not attached to, the base membrane. Thus the jaws of this alternate embodiment are harder to separate than the previous embodiment. The two jaws are further provided with two longitudinal ribs 178, 180. In this embodiment the cords are grabbed with a greater force.

In order to facilitate the separation of the jaws, arm 140 is oriented substantially perpendicularly to the base 120. In the previous embodiment arm 40 was oriented at approximately 45° with respect to the base. This alternate embodiment may also be molded by standard techniques. Preferably, arm 140 is hollow as at 190 (FIG. 8) to save material.

Obviously, numerous modifications may be made without departing from the scope of the invention as defined in the appended claims.

What is claimed is:

1. A device for engaging a cord comprising:
   a base with an opening in a central portion thereof;
   a first jaw, attached resiliently to and raised from said base, and having a first end face; and
   a second jaw, attached resiliently to and raised from said base, and having a second end face, said first and second jaws being constructed and arranged with the faces in an opposed configuration formed to urge said faces toward each other and defining a cord engaging surface therebetween; and
   a separating means connected to one of the jaws.
2. The device of claim 1 wherein said separating means comprises an arm extending away from said base.
3. The device of claim 2 wherein said first jaw has a top surface and said arm is rigidly connected to said top surface.
4. The device of claim 1 wherein each said jaw comprises a plate which gradually thickens from said base toward said end faces.
5. The device of claim 1 wherein each said jaw comprises a top surface and two stiffening side skirts.
6. The device of claim 1 wherein the base is circular and comprises a torridal rim and a central membrane.

* * * * *